Patented Nov. 8, 1938

2,136,020

UNITED STATES PATENT OFFICE 2,136,020

EMULSIONS AND PROCESS OF MAKING SAME

Harold Pirie, Runcorn, England, assignor to Imperial Chemical Industries Limited, a corporation of Great Britain No Drawing. Application July 22, 1936, Serial No. 91,992. In Great Britain July 29, 1935

6 Claims. (Cl. 167—32)

This invention relates to improved compositions capable of being dispersed in water to form aqueous emulsions containing chlornaphthalenes and to the manufacture of such compositions and emulsions.

It has previously been proposed to emulsify hydrogenated naphthalenes with halogen hydrocarbons such as tetrachlorethane by means of alkali metal ricinoleates, sulphonated oils and the like, and also to emulsify substances by dissolving them together with aliphatic or sulphonated aliphatic acids of high molecular weight in an auxiliary solvent such as tetrahydronaphthalene, and mixing the solution with a solution of an alkali or an alkali metal salt. In British specification 413,756 there have also been described compositions containing wax-like chlorinated naphthalene mixed with a limited amount of water. In the preparation of these compositions the chlornaphthalene was brought into a liquid state, either by melting or by the aid of a volatile solvent.

The present invention comprises a process for the production of compositions containing hydrogenated and chlorinated naphthalenes capable of being dispersed or emulsified in aqueous media.

According to a further feature the invention also comprises a method for the preparation of emulsions by incorporating a hydrogenated naphthalene with a chlorinated naphthalene, and mixing the product with water in the presence of an emulsifying agent.

Emulsions prepared according to this invention possess the great advantage that they may readily be diluted with cold hard water. They are also relatively non-phytocidal in character, particularly those derived from the more highly hydrogenated naphthalenes, and thus may be used for combating pests or fungi on plants without fear of damaging the latter.

The chlornaphthalenes which may be used in the preparation of these emulsions include those which are liquid at normal temperatures, such as mono- or dichlornaphthalenes as well as the more highly chlorinated naphthalenes which are usually to be found as solid mixtures of wax-like appearance. Similarly the invention is not limited in respect of the hydrogenated naphthalene to be used; both tetra- and decahydronaphthalene have been found to give satisfactory results.

In preparing the compositions, the chlorinated and hydrogenated naphthalenes may be incorporated in any suitable manner. Thus the liquid chloro-bodies may be merely mixed with the hydrogenated naphthalene, or in the case of the solid chloro-bodies a solution may be made using the hydro-body as the solvent. I have not found it necessary to observe any particular ratio between the various constituents, except that it is desirable to have the mixture in the liquid state for further working up. In this connection I may mention that the higher the chlorine content of the chlornaphthalene the more hydrogenated naphthalene is needed for solution; thus for example, in using a chlornaphthalene containing 44% chlorine, approximately one part of decahydronaphthalene for each part of chlornaphthalene suffices to effect solution, while with a chlornaphthalene containing 59% chlorine approximately four to five parts of decahydronaphthalene are required. The proportion between the two constituents should be regulated to this end, though the use of an elevated temperature or the addition of another solvent is also permissible to bring about the desired fluid condition of the mixture.

The emulsions are then readily prepared from these compositions by uniform admixture with a limited amount of water in the presence of known emulsifying or dispersing agents such as, e. g. ammonium caseinate, Turkey red oil, sulphonated mineral oils or goulac, and if desired a stabilizer. In general it may be said that about one part of water for every three parts of the composition suffice to produce an emulsion which can if required be readily dispersed by the addition of further quantities of water.

Among the uses to which the aqueous emulsions can be applied may be mentioned the impregnation of textiles and the control of pests, e. g. as fungicides and insecticides.

The following examples in which all parts are by weight are illustrative of specific methods of preparing emulsions according to the invention. In both examples a stable emulsion was obtained which dispersed very readily in further quantities of water. The substance referred to as goulac is an emulsifying agent derived from the residual lyes in the boiling of wood pulp by the sulphite process.

Example I 180 parts of monochlornaphthalene were mixed with 20 parts of decahydronaphthalene and the mixture then added to a solution of 10 parts of goulac in 60 parts of slightly alkaline water (0.05% NaOH). The whole was then subjected to violent agitation in a high speed stirrer.

*Example II*

In this example 100 parts of a mixture of polychlornaphthalenes of average chlorine content 42% were first dissolved in an equal weight of decahydronaphthalene. This solution was then added to the same quantity of goulac solution as was used in the first example and a similar procedure followed.

I claim:

1. A composition of matter capable of being dispersed or emulsified in aqueous media comprising a normally solid chlorinated naphthalene incorporated with hydrogenated naphthalene in such proportion that a liquid product is obtained emulsified in a limited quantity of water.

2. A composition of matter capable of being dispersed or emulsified in aqueous media comprising a normally solid chlorinated naphthalene incorporated with deca-hydro-naphthalene in such proportion that a liquid product is obtained emulsified in a limited quantity of water.

3. An aqueous emulsion or dispersion containing as a dispersed phase a normally solid chlorinated naphthalene incorporated with hydrogenated naphthalene in such proportion that the dispersed phase is a liquid.

4. An aqueous emulsion or dispersion containing as a dispersed phase a normally solid chlorinated naphthalene incorporated with decahydro-naphthalene in such proportion that the dispersed phase is a liquid.

5. The process for emulsifying normally solid chlorinated naphthalenes which comprises liquefying the chlorinated naphthalene at least in part by incorporating therewith a solvent comprising a hydrogenated naphthalene and emulsifying the liquefied product in an aqueous medium.

6. A concentrated aqueous emulsion or dispersion readily dispersible in aqueous media characterized in that the dispersed phase consists of chlorinated naphthalene incorporated with a solvent comprising a hydrogenated naphthalene.

HAROLD PIRIE.